No. 825,106. PATENTED JULY 3, 1906.
S. BRADLEY.
MEANS FOR LOADING AND UNLOADING GRAIN.
APPLICATION FILED JULY 13, 1905.
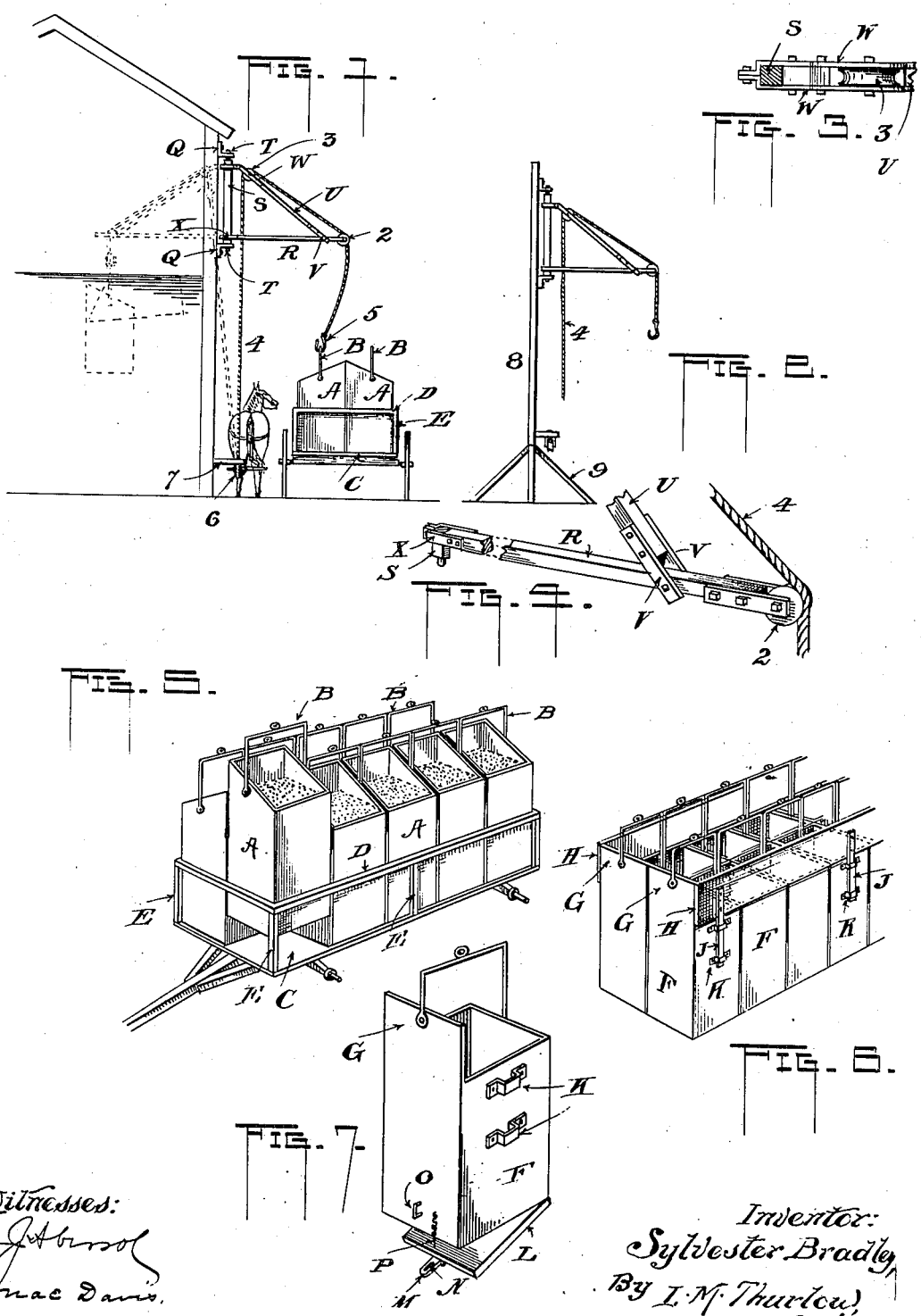
Witnesses:
Inventor:
Sylvester Bradley
By I. M. Thurlow
Atty.

UNITED STATES PATENT OFFICE.

SYLVESTER BRADLEY, OF PEORIA, ILLINOIS.

MEANS FOR LOADING AND UNLOADING GRAIN.

No. 825,106.  Specification of Letters Patent.  Patented July 3, 1906.

Application filed July 13, 1905. Serial No. 269,562.

*To all whom it may concern:*

Be it known that I, SYLVESTER BRADLEY, a citizen of the United States, residing at Peoria, in the county of Peoria and State of Illinois, have invented certain new and useful Improvements in Means for Loading and Unloading Grain; and I do hereby declare that the following is a full, clear, and exact description of the invention, which will enable others skilled in the art to which it appertains to make and use the same.

This invention pertains to means for handling bulk material, such as grains of all kinds dirt, ashes, and the like, but relates more particularly to the transportation and loading and unloading of grains, such as wheat, oats, barley, shelled corn, and corn on the ear.

The invention has for its main object the handling of grains in a more easy and simple manner and with cheaper apparatus than usually employed for this purpose.

A further object is to provide a series of receptacles to be carried on a wagon and which may be raised therefrom one by one and dumped, thereby avoiding the laborious task of unloading a wagon by means of a scoop-shovel.

A further object is to provide a series of receptacles of peculiar form by which they may be readily and easily relieved of their contents.

In the appended drawings, Figure 1 is an elevation of a building, showing a swinging arm thereon and a wagon having grain-receiving boxes thereon and a rope and hook for use in raising said boxes. Fig. 2 is an elevation of a portable member, showing the swinging arm thereon. Fig. 3 is a horizontal section of a pivoted member, showing a grooved pulley in connection therewith. Fig. 4 is a perspective view of a part of the swinging arm shown in Figs. 1 and 2. Fig. 5 is a perspective of a wagon without its wheels, showing a series of grain-boxes thereon. Fig. 6 is a perspective view of a series of boxes of modified form. Fig. 7 is a perspective view of one of the boxes shown in Fig. 6 on a larger scale.

My aim in bringing out the devices to be described is, as before intimated, to dispense with the costly elevators and wagon-dumps now in use and provide a simple and effective means for easily and quickly handling the grain whether transported from the field to the granary or from building to building or from storehouses to railway-cars, as the case may be, the means being of equal service in any of these duties.

I first provide a series of receivers—such, for instance, as square boxes A, of metal or wood, of which there may be any desired number, according to convenience in arranging and handling them. Each receptacle is provided with a bail B, as shown in Fig. 5, suitably pivoted thereon to allow it to suspend the said receptacle while the latter is being tilted to pour out its contents, as shown by broken lines in Fig. 1. These receptacles or boxes may be provided of such size that they can be placed in the ordinary wagon-box, or a special platform C for a wagon, Fig. 5, may be employed, having a railing D, mounted on uprights or posts E, by which the said boxes may be inclosed and held in place. As a matter of course sufficient space is provided so that each box may be removed from the platform and replaced without binding, and, as shown in the figure last referred to, the tops of the boxes or receptacles are beveled with their high sides abutting, as also illustrated in Fig. 1. This answers a twofold purpose. In picking corn in the field the high portions serve as stops for the ear-corn as it is thrown in, thus taking the place of the usual stop-board used on the ordinary wagon-box. Secondly, the said high sides of the members serve as spouts out of which the grain or other material may be poured as from a hopper or similar device.

In Figs. 6 and 7 a modified form of the boxes is shown, in which F indicates said boxes, whose tops are cut off at right angles to their heights, except the end ones, which are provided with vertical extensions G. In order that greater capacity may be had, side-boards H H are provided, each having a vertical member J secured thereto at intervals adapted for entering looped members K on the said boxes. These boards are employed more particularly for ear-corn and are removed when desired to use the boxes for other material, such as small grains and the like. It will be seen that the end extensions G of the end boxes now serve to complete an inclosure, together with the said boards H. After the ears of corn are thrown off, so as to reveal the tops of the boxes, the latter may be raised and emptied, as with the other form described. I may provide with either form of box a hinged bottom L, Fig. 7, having a hinged hasp M, slotted at N to engage a staple O, through which passes a pin P, suspended from a chain. By this means the boxes may be relieved of their burdens by simply withdrawing the pin, and thereby I provide two methods by which the emptying operation may be accomplished.

As a means for easily removing and replacing the boxes I provide both a portable and stationary crane. (Shown in Figs. 2 and 1, respectively.) In the latter figure a pair of brackets Q are attached to the granary or other building to be loaded into or loaded from, and in these is swung an arm R, secured at one end to a vertical member S, having reduced ends, as at T, to enter holes in said brackets. Said arm R is braced by means of an arm U, attached to said arm R by means of straps V, Fig. 4. The upper end of the arm U is clamped, by means of straps W, to the said vertical member S, as also is the arm R by means of straps X, Fig. 4. The outer or free end of the arm R carries a grooved pulley 2, as shown, and a similar pulley 3 is carried between the straps W, near the upper end of the arm U. A rope or cable 4 passes over these pulleys, one end bearing a hook 5, the other end descending toward the ground and passing beneath a pulley 6 and thence having attachment with a draft member to which a horse may be hitched, the said pulley 6 being suspended from a suitable member 7, secured to the building or elsewhere in the immediate vicinity. It is to be understood that the crane thus constructed is capable of swinging in a horizontal plane, as shown in broken lines in Fig. 1, and by placing the hook 5 through the bail of any one of the boxes it may be raised from the wagon, filled or emptied, as the case may be, by swinging it to and over the bin or other receptacle, and returned to the wagon and another handled in like manner, and so on. The portable device shown in Fig. 2 consists of a pole 8, having bracing members 9 for sustaining it in a vertical position. Upon said pole the crane, already described, is placed, thereby providing for handling the boxes in the field or other place remote from a building, or where no crane exists for a particular piece of work within a building the portable one is always ready at hand by carrying it upon the wagon carrying the boxes to be handled.

Evidently I may alter the construction and arrangement of the boxes or the crane without departing from the spirit or intent of the invention.

Not only can the swinging arm or crane be used, but the rope 4 may be used on any of the hay-carrier tracks, whereby the boxes may be raised from the wagon and carried high within a building and deposited where desired, thus making the handling of grain very simple and thorough.

I claim—

1. In grain-transporting means, a wheeled vehicle, and a series of receptacles carried thereon the same having their tops beveled substantially as shown and placed with their high portions back to back, and bails on the several receptacles for handling the same.

2. In grain-transporting means, a series of receptacles having thier tops beveled and placed back to back, and a vehicle in which said receptacles are carried for the purposes described.

3. In grain-transporting means, a series of receptacles having beveled tops, their high sides placed back to back, the said high sides serving as stop-boards as described, and a bail for each said receptacle and a vehicle for carrying the several receptacles.

In testimony whereof I affix my signature in presence of two witnesses.

SYLVESTER BRADLEY.

Witnesses:
L. M. THURLOW,
A. KEITHLEY.